United States Patent [19]

Pavitt

[11] 4,244,112

[45] Jan. 13, 1981

[54] APPARATUS TO AID ALIGNMENT OF MOTOR VEHICLE WHEELS

[76] Inventor: Frederick C. Pavitt, 2-54 Avoca St., Randwick, New South Wales 2031, Australia

[21] Appl. No.: 46,398

[22] Filed: Jun. 6, 1979

[30] Foreign Application Priority Data

Jun. 14, 1978 [AU] Australia .............................. PD4721

[51] Int. Cl.³ ............................................. G01B 5/255
[52] U.S. Cl. .................... 33/203.15; 33/288; 33/336
[58] Field of Search ........... 33/203.15, 203.16, 203.21, 33/203.17, 288, 336

[56] References Cited

U.S. PATENT DOCUMENTS

| 1,601,261 | 9/1926 | Prather | 33/203.15 |
| 2,275,137 | 3/1942 | Friestedt | 33/203.15 X |
| 2,655,731 | 10/1953 | Sibble | 33/203.15 X |
| 3,012,325 | 12/1961 | Elam | 33/288 |
| 3,088,214 | 5/1963 | Bennett | 33/203.15 |
| 3,091,862 | 6/1963 | MacMillan | 33/288 |
| 3,460,264 | 8/1969 | Cluchey | 33/203.17 |

FOREIGN PATENT DOCUMENTS 1071620  12/1959  Fed. Rep. of Germany ............. 33/288

Primary Examiner—William D. Martin, Jr.
Attorney, Agent, or Firm—Ladas & Parry

[57] ABSTRACT

An apparatus to aid in the aligning of motor vehicle wheels comprising a bar to engage a tire of the wheel, and two plate members attached to the bar to support the bar on a ground surface upon which the tire is resting and to maintain the bar parallel to the surface.

2 Claims, 4 Drawing Figures

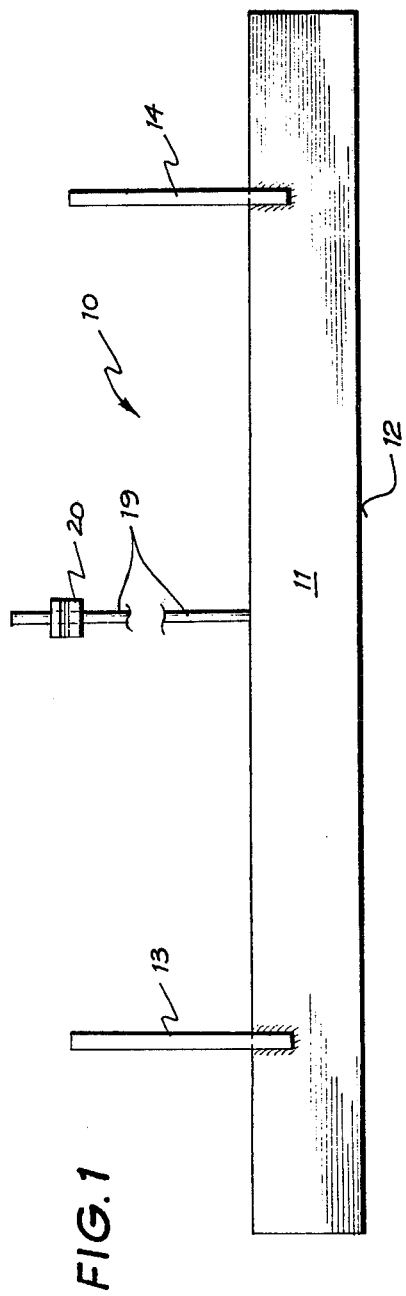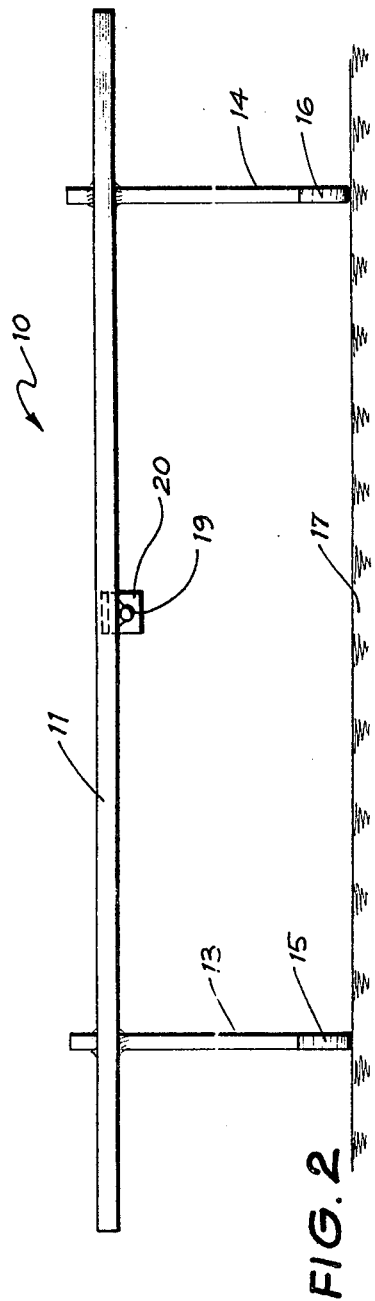

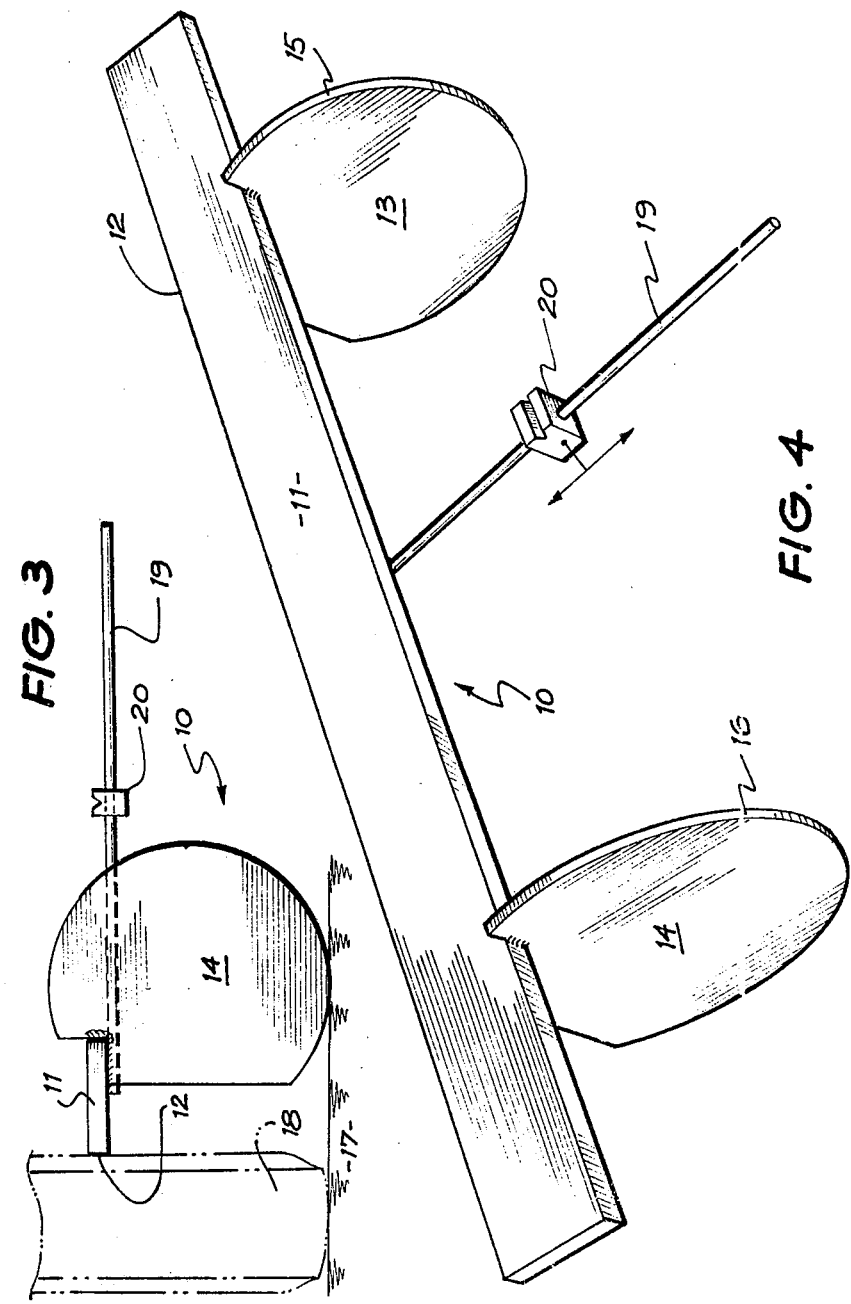

APPARATUS TO AID ALIGNMENT OF MOTOR VEHICLE WHEELS

The present invention relates to motor vehicle wheel aligning apparatus and more particularly but not exclusively to apparatus which aids in the correct alignment of motor vehicle wheels so as to have a desired "toe-in".

Conventional apparatus used to adjust the "toe-in" of the front wheels of motor vehicles is generally cumbersome and time consuming in operation and accordingly there has been a need for a simple device which aids in the aligning of motor vehicle wheels so as to have the correct "toe-in".

It is the object of the present invention to overcome or substantially ameliorate the above disadvantages.

There is disclosed herein an apparatus to aid in the aligning of motor vehicle wheels, said apparatus having a straight edge to engage a wheel at two angularly spaced locations on the wheel, a peripheral surface or surfaces to engage a ground surface upon which the wheel is resting, and wherein said peripheral surface(s) is adapted to maintain said edge parallel to said ground surface while said edge is moved into contact with said tyre.

A preferred form of the present invention will now be described by way of example with reference to the accompanying drawings in which:

FIG. 1 is a plan view of an apparatus to aid in the aligning of motor vehicles:

FIG. 2 is a front elevation of the apparatus of FIG. 1;

FIG. 3 is an end elevation of the apparatus depicted in FIG. 2; and

FIG. 4 is a modification of the apparatus of FIGS. 1 to 3.

The apparatus 10 comprises a bar 11 which has a longitudinal edge 12 and two plate members 13 and 14. The two plate members 13 and 14 extend in generally parallel planes which planes intersect the longitudinal axis of the bar 11 at 90°. The plate members 13 and 14 have curved peripheral surfaces 15 and 16 which are adapted to engage a ground surface 17 upon which a wheel 18 of a motor vehicle is resting. The surfaces 15 and 16 are adapted to engage the ground surface 17 to maintain the edge 12 parallel to the ground surface 17.

In operation the apparatus 10 is located so as to abut a tire 18 of a motor vehicle so that the edge 12 contacts the tire at two angularly spaced positions so that the edge extends generally within a plane tangential to the edge of the tyre. Additionally, the plate members 13 and 14 are adapted to allow the apparatus 10 to roll on the ground surface 17 so that the edge 12 abuts and contacts the tire 18 at two spaced locations. The bar 11 is beared toward the tire under the influence of gravity. So that the "toe-in" of the motor vehicle front wheels may be measured, two of the apparatus 10 are employed, one against each of the front wheels of the vehicle. With the tires pointing in a generally forward direction the distance is measured between the two bars 12 of the two apparatuses 10 which are resting against the inner surfaces of the tires. The two measurements are taken and compared to determine the "toe-in". The measurements are between points on the two bars, which points are horizontally below the most forward and rearward points of the diameter of the tire. The apparatus 10 may also be used to measure the angular displacement of the rear wheels of a vehicle by again placing the two bars up against one of the rear wheels and comparing the angular displacement of the bar with respect to the longitudinal axis of the vehicle.

With reference now to FIG. 4 wherein the apparatus 10 is provided with a rod 19 to which is slidably attached a notched part 20 adapted to receive a length of string or rope. This arrangement enables the alignment of tires on for example, trucks having differently spaced rearward and frontward tires.

What I claim is:

1. An apparatus to aid on the aligning of motor vehicle wheels, said apparatus comprising:
   (a) a bar having a longitudinal straight edge to engage a wheel at two angularly spaced locations which are horizontally aligned;
   (b) two disc members attached to said bar and extending therefrom so as to be generally normal to said edge, each said member having an arcuate edge adapted to engage a surface upon which said wheel is resting so that said bar in use is biased under the influence of gravity to engage said wheel; and
   (c) a rod attached to said bar and extending generally normal to the bar edge so that in use said rod is generally horizontal.

2. The apparatus of claim 1 further including a notched part slidable along said rod adapted to engage and retain a flexible line.

* * * * *